United States Patent [19]

Dennis et al.

[11] Patent Number: 5,342,129
[45] Date of Patent: Aug. 30, 1994

[54] BEARING ASSEMBLY WITH SIDEWALL-BRAZED PCD PLUGS

[75] Inventors: Thomas M. Dennis, Houston; Mahlon D. Dennis, Kingwood, both of Tex.

[73] Assignee: Dennis Tool Company, Houston, Tex.

[21] Appl. No.: 860,045

[22] Filed: Mar. 30, 1992

[51] Int. Cl.$^5$ .................. F16C 17/04; F16C 33/04; E21B 10/22

[52] U.S. Cl. .................. 384/420; 175/371; 384/95; 384/285; 384/907.1

[58] Field of Search .................. 384/95, 97, 282, 284, 384/285, 297, 420, 907.1; 175/107, 371

[56] References Cited

U.S. PATENT DOCUMENTS

| | | | |
|---|---|---|---|
| 4,410,054 | 10/1983 | Nagel et al. | 384/95 X |
| 4,468,138 | 8/1984 | Nagel | 384/420 X |
| 4,708,496 | 11/1987 | McPherson | 384/95 X |
| 4,729,440 | 3/1988 | Hall | 384/907.1 X |
| 4,789,251 | 12/1988 | McPherson et al. | 384/282 X |
| 4,802,539 | 2/1989 | Hall et al. | 175/371 X |

Primary Examiner—Thomas R. Hannon
Attorney, Agent, or Firm—Gunn & Kuffner

[57] ABSTRACT

A method of forming a bearing assembly is set forth. A PCD disk typically of circular construction is joined to a cylindrical plug formed of support metal. The plug is registered with respect to an internal shoulder in a passage formed in a ring for the bearing assembly. Multiple PCD disks are installed in the same fashion. In assembly, the disk is attached to the cylinder, the cylinder is wrapped in brazed material, then the cylinder with the brazed material wrapping is registered on an internal shoulder in a drilled passage in the bearing assembly. A brazing temperature which is too low to damage the material is applied to complete joinder. Then, multiple disk faces supported by individual disk in a circle around the bearing assembly can be lapped to assure that they are brought to a common height with respect to a reference plane.

15 Claims, 1 Drawing Sheet

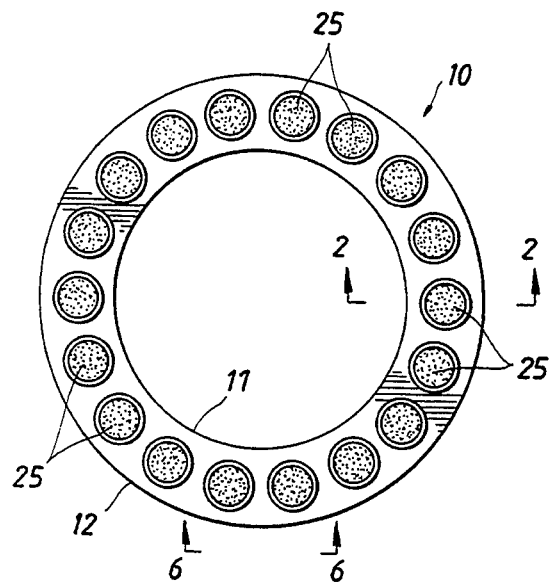
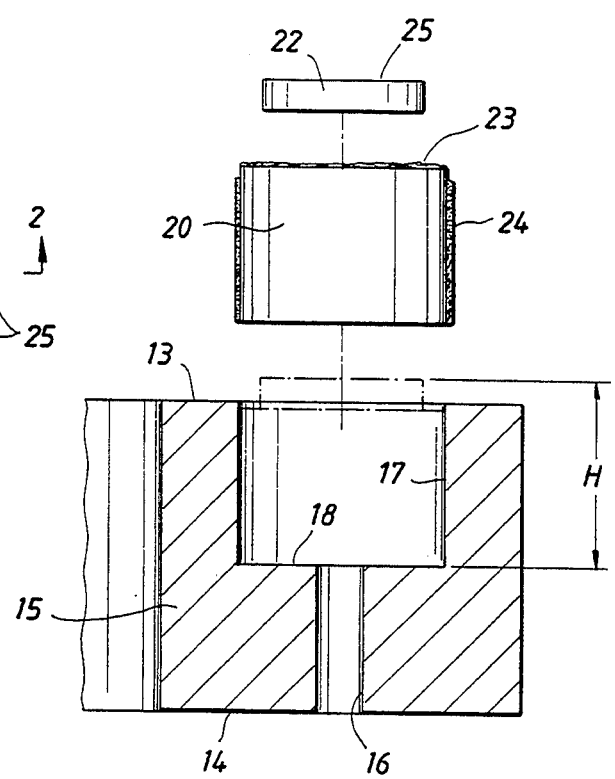
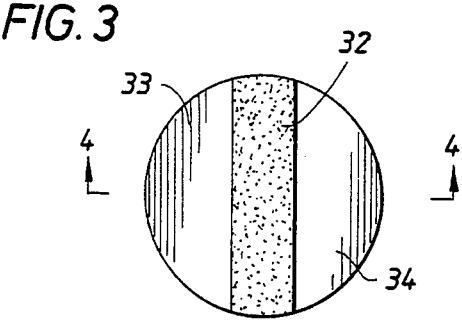
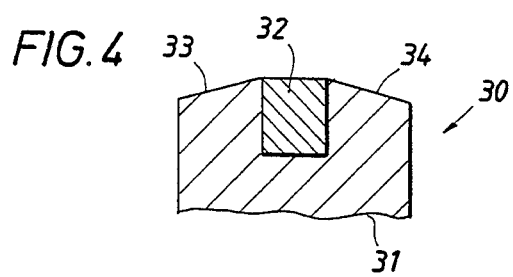
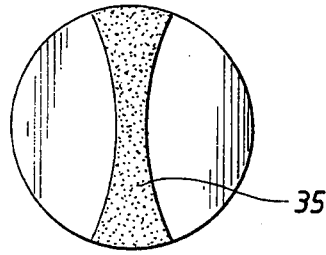
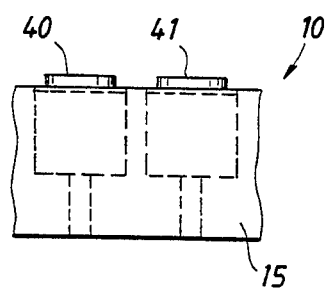
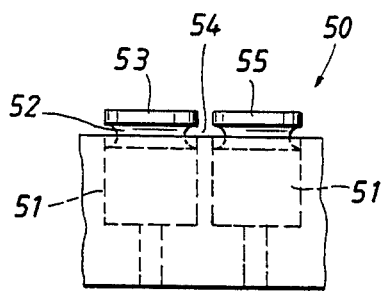

BEARING ASSEMBLY WITH SIDEWALL-BRAZED PCD PLUGS

BACKGROUND OF THE DISCLOSURE

This disclosure is directed to a method of making a bearing assembly and also describes a bearing assembly with an insert for that bearing assembly whereby improved performance can be obtained. It is particularly intended for use in rotating devices such as turbine motors and the like which are exposed to drilling fluids in a well borehole.

In a typical downhole device operated at the lower end of a drill string, a flow of several hundred gallons of drilling fluid per minute is typically pumped down a drill string to lubricate the equipment at the bottom of the drill string and to wash cuttings away from the area where the drilling fluid returns to the surface. This upward flow is in the annular space on the exterior of the drill string. Ordinarily, drilling is occasioned by the use of a three cone drill bit that is mounted on the drill string which is rotated from the surface. In recent years, special drilling circumstances have enhanced the necessity of drilling a well borehole through the use of downhole motors and the like. This requires rotating equipment to be affixed to the drill string which is mud powered so that the rotating equipment must operate in this environment completely surrounded by the drilling fluid. Drilling fluid is typically formed of various earth materials such as clay and may include heavier particles such as barites. It is intended to lubricate the surfaces. Inevitably, the material is an abrasive even though the particles might be relatively small.

The drilling fluid is therefore circulated down the drill string and flows all around the rotating equipment. The present disclosure is directed to a bearing assembly which is formed of individual bearing surfaces. The bearings are formed of crystalline material and one preferred material is synthetic diamonds, a material believed to be well known and referred to generally hereinafter as PCD. The PCD can be shaped in the form of a circular button. It has an exposed surface. The exposed surface is ideally contacted against an opposing or rotating surface so that the relative motion between the two surfaces engenders continued polishing of the PCD material making up the bearing assembly. In this disclosure, a metal ring is disclosed which serves as a housing or collar on which the buttons are mounted, and the buttons are in turn polished by an opposing surface. Generally, the buttons are described as having a lapped surface which means that they have been polished to provide a very smooth bearing surface. It is possible to make such a bearing assembly by use of techniques to be currently employed. As a generalization, a steel ring is drilled with a number of parallel cylindrical holes. A PCD disk is joined to a cylindrical plug. The plugs are placed in the matching holes in the ring while braze material is placed in the bottom of the hole below the plug. Several such plugs equipped with PCD disks are mounted in like fashion. They have slightly different heights, but differences in height are accomodated by differences in the thickness in the brazed material. Differences in height are avoided as the brazed material is melted. This is normally accomplished by placing the steel ring in a furnace or even between two support plates, one above and one below the ring. The ring is inverted so that the ring is above the individual PCD disks and support plugs on which they are mounted, and all are brought into registration. However, the registration involves, considered vertically from the top to bottom, the disk on the supportive plug, a layer of brazed material of differing thicknesses, and then the steel ring. The layer of brazed material represents a weak area mechanically because it is not as strong as the other materials, and also because the use of the equipment typically encounters chattering and vibration which acts on the brazed metal to cause failure. Therefore the present disclosure sets forth a method of fabrication which has advantages over that procedure, and is more readily implemented in the manufacture of an assembly with the multiplicity of bearing surfaces formed of PCD disks.

This disclosure sets forth a bearing assembly formed in a steel ring which has a number of PCD disk which become lapped in use so that the surfaces are able to support a coacting rotating surface. Heat is liberated in the friction of the two surfaces contacting one another during rotation. Preferably, the equipment is operated in a bath of lubricant material which can in most instances be drilling fluid. The cooling of the disk involves heat transfer from the PCD material into a supporting cylindrical plug and then a supporting steel ring. The steel ring generally transfers heat quite well. In like fashion, the heat transfer characteristics of the supporting plug are normally quite good. The supporting plug can be formed of any number of materials, but in many instances, they are formed of tungsten carbide fabricated into a cylindrical plug. The plug is tungsten carbide in a matrix of support metals which form a plug. The plug is required to transfer heat out of the bearing surface, or restated, transfer heat away from the PCD disk. Heat transfer is a limitation of the device. Thus, very large PCD disks run the risk of damage from excessive heat build up. One approach to reduction of this is to place scored grooves across the face of such disk. This is difficult to achieve because it requires machining the PCD disk with some type of machining device; machining must be carefully controlled, and increases the cost dramatically. The grooves will introduce fluid flow across the face of the PCD disk so that cooling can be obtained.

One advantage of the device of this disclosure is the arrangement of the disks so that they are supported by a cylindrical plug. The plug can be formed in the known fashion of tungsten carbide bits or particles in a supportive alloy matrix which forms the cylindrical plug. The cooperative disk and plug are structurally modified to increase exposure to the circulating fluids about the disk and the supportive plug. The disk is formed of a piece of material which is normally cut in circular fashion and is mounted in the ring so that there is a locus of contact area forming a band around the bearing elements. This defines across the center of the disk a diametric region. It is this region which sustains most of the wear and which provides most of the bearing contact area. In this region, the surface is frictionally engaged and therefore creates most of heat. The portions of the circular disk remote from the diametric region are less significant, and in fact, can be omitted. Accordingly, rather than a circular disk, one version of the present equipment utilizes a simple diametric strip. It can be formed of such a disk which is trimmed so that the remaining portion is a simple strip, ideally having a common width, or having a fixed width in one embodiment. It is not however required that the width of the strip be fixed; if the marginal edges which define the strip are approximately parallel, they need not be straight lines and they need not be parallel; they can be formed of curved segments. They can be formed of many types of curves; they can even be formed of straight line segments. In fact, the strip which provides the diametric support region can be mounted with the support cylinder also broken away or beveled in that region. This increases the proximity of the cooling fluid to the diametric strip which carries the weight.

Going now to the shape of the plug, it can be beveled to reduce its mass immediately adjacent to the diametric support strip. As will be developed, this permits the drilling fluid to circulate closely to the PCD disk. In this construction, the plug and disk are both modified so that they are both exposed to a greater flow of lubricant.

In a modified embodiment, the support plug beneath the PCD disk is fashioned in the shape of an undercut upstanding mounting stem which flares below the PCD disk to support the PCD disk. The upstanding support plug has a nether shoulder which is exposed for fluid flow. This markedly increases the exposed area permitting fluid flow to lubricate and cool the PCD disk and enhances heat transfer from it. In this particular embodiment, the support plug is undercut, defining the nether shoulder or face, and providing a fluid flow channel when multiple similar cooperative support plugs are installed in a single ring.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a planned view of a bearing ring assembly incorporating a multiplicity of similar cylindrical PCD disks in the assembly;

FIG. 2 is a sectional view along the line 2—2 along the bearing ring assembly in FIG. 1 showing a PCD disk which affixes to a cylindrical plug which in turn is joined to a part of the bearing assembly;

FIG. 3 is a planned view of a modified form of the PCD disk and support plug;

FIG. 4 is a sectional view along the line 4—4 showing details of construction of the PCD material in the support plug as shown in FIG. 3;

FIG. 5 is an alternate view of the PCD disk construction to that shown in FIG. 3 of the drawings;

FIG. 6 is a side view of the bearing assembly showing adjacent PCD disk and supportive plugs which extend fully around the bearing assembly; and FIG. 7 is a view similar to FIG. 6 showing an alternate form of construction of the PCD disk and supportive plugs having an improved cooling fluid circulation construction.

DETAILED DESCRIPTION OF THE PREFERRED EMBODIMENTS

Attention is now directed to FIG. 1 of the drawings where the numeral 10 identifies a bearing assembly in accordance with the present disclosure. It is formed on a steel ring, preferably formed of high quality steel. This ring includes a cylindrical inner surface 11 and a concentric outer surface 12 to enable the ring to be mounted in rotating equipment typically installed in a downhole location. It has a top face 13 better shown in FIG. 2 of the drawings. The parallel bottom face 14 defines a support surface so that the ring can be fastened to or rested on a cooperative shoulder for the ring. The faces 13 and 14 are preferably parallel. The ring is formed of a high quality metal such as 4310 or some other model of steel able to be used in difficult applications, for instance, at elevated temperatures with high thrust loads, with substantial high speed rotation, perhaps with chatter and in the presence of abrasive fluids.

The steel ring better illustrated in FIG. 2 and identified by the numeral 15 is drilled with a number of holes which are used to form pilot passages, one being identified at 16. The passage 16 serves as an alignment or guide passage so that a larger diameter cylindrical hole can be formed at 17, this having a transverse bottom shoulder 18. The passage 16 also serves as a gas outlet during brazing to enable gases formed during this process to escape. If not permitted to vent through the passage 16, the gases during heating will otherwise pressurize the plug and interrupt seating with the braze to anchor the plug. The shoulder 18 serves as a registration surface. It is preferably parallel to the surface 14. Moreover, it is a support service for a cylindrical mounting plug 20 which is positioned against the shoulder 18. The plug 20 is typically formed of materials such as tungstun carbide supported in an alloy of suitable metals to define the cylindrical plug which has good heat transfer characteristics. The cylindrical plug 20 is constructed as a right cylinder and has a size to fit within the large opening at 17 and registers against the surface or shoulder 18. The cylindrical plug 20 is used to support a PCD disk 22. The disk 22 in one embodiment is circular, and has a specified height. The disk 22 is fastened to or joined with the cylindrical plug 20 by means of an adhesive layer 23. This layer is preferably any suitable adhesive material able to withstand the temperatures involved, and the preferred form of adhesive is one which melts about 600° C. The fabrication procedure used in placing the PCD disk 22 on the plug 20 involves a first assembly step whereby these two components are joined. They are joined by the use of the material 23 which joins the two cylindrical members. This defines the height of the insert which is later placed in the drilled opening 17. The sequence of construction therefore involves the following steps. First, the upstanding cylindrical plug 20 is joined to the PCD disk 22 with the adhesive material 23. That forms a cylindrical body of the two components having a specified height H. That is measured very precisely so that there is assurance and certainty that the height is controlled for reasons to be explained. The plug diameter is sized so that it fits within the drill passage 17 with very little clearance, clearance being in the range of perhaps 0.006±0.001 inches. Before the cylindrical plug 20 is inserted into the passage 17, a sheet of brazed metal is wrapped around it as identified by the numeral 24. This sheet of material is wrapped around the cylindrical plug to a height sufficient that almost the whole external surface of the plug 20 is in contact with the sidewall of the passage 17. The plug after wrapping with the brazed material is then forced into the opening 17. The original diameter of the plug 20 is less and therefore permits free entry of the plug into the passage 17. The brazed material fills the annual gap to the point that the gap is substantially full of the brazed material. Indeed, an interference fit would pose no particular problem so long as the brazed material as well as the plug can be forced into the passage or opening at 17. Assembly thus involves the wrapping of the cylindrical plug with the brazed material in sheet form and inserting it into the drilled passage 17. This registers the cylindrical plug against the shoulder 18. The distance H is measured to assure that the inserted plug registers the top face 25 at the requisite distance H. Going back to FIG. 1 of the drawings, there are several such bearing faces 25. It is not uncommon to form the bearing assembly 10 with as many as 24 or 36 of the PCD disk. They are all collectively positioned at the height required for proper operation. For instance, the distance H is measured and each is brought into registry with that height or distance. The several plugs that are inserted are supported on the shoulder 18 of the several drilled passages or holes in the ring shaped support body 15. They are all brought into registry at a common height with a specified tolerance range. Typically, registration is tightly controlled for example even to the measure of 0.00001 inch deviation or tolerance. At this juncture the several plugs (represented by the symbol N where N is a whole number positive integer) or thus assembled so that the N PCD disk faces 25 are at the distance H with respect to the support ring 15.

The next step in assembly of the bearing assembly 10 is to then heat the ring 15 to the temperature sufficient to cause brazing of the plugs 20. It should be noted that there are temperature limits for the materials involved in this device. The brazed material 25 thus melts and makes a brazed joint with the respective plugs 25 to assure proper construction without damage from the heat, the brazed material typically melts at a temperature above about 500° C. Assume for purposes of description that it melts at 620° C. Brazing is accomplished just above that temperature. The ring 15 is not damaged by that temperature. The plug 20 and the bonded PCD disk 22 likewise are not damaged by temperatures accomplished in brazing. Quite obviously, the temperature are limited to a range where brazing can be safely accomplished without damage to the device.

Once brazing has been completed, the N plugs are properly attached to the ring 15 so that the device can then be used. At this juncture, the N disk provide faces which are located at the common distance H. The ring can then be rotated against a coacting surface formed of a similar set of PCD disk so that the two contacting and rotating surfaces can be lapped meaning they are smoothed by rubbing so that all the N faces 25 are brought to a precise common height.

This mode of construction has the advantage that a quality bond is formed for the PCD disk. The several disks are all held in place by the brazing material which is on the side area of the mounting cylindrical plugs. For shock loading, the cylindrical plug bottoms against the shoulder 18, so that the N faces 25 can then be lapped to be brought into perfect alignment at the distance H. The lapping process involves the abrading of the surface 25 exposed to a solvent carrying a cutting particle in it while the bearing assembly 10 is rotated against a cooperative surface.

As a generalization, lapping the PCD disk 22 will accommodate very modest variations i.e. those in the range of a few mils irregularity. It provides a common or true surface which includes all of the several disk faces 25. When completed, the device can then be installed and can be used routinely in rotating machineries in the environment mentioned.

Going now to FIG. 3 of the drawings, a modified form of device is shown. Briefly, the numeral 30 identifies the embodiment shown in FIGS. 3 and 4 jointly and it is constructed with an upstanding cylindrical plug 31. Plug 31 supports a PCD disk which has been cut in the form of a diametric strip at 32. The diametric strip 32 is positioned with respect to the support ring 15 shown in FIGS. 1 and 2 so that the length of the strip 32 is rotated whereby the rotation about the center line of the bearing assembly 10 causes movement in the direction of the arrow marked in FIG. 3. In other words, the full length of the strip 32 provides a bearing surface for the full width of the circular plug 31. Portions of the plug are cut away at 33 and 34. Were the strip 32 to be fully extended in the form of a complete circle, the regions that are omitted at 33 and 34 provide substantially less support than does the central or strip shape portion at 32. In operation, this basically deflects or imposes the bulk of the wear on the strip 32, and leaves the regions 33 and 34 free of load. Not only can the PCD material be omitted from these regions, the cylindrical plug can be beveled at 33 and 34. This enables lubricating fluid to get much closer to the strip 32 for heat dissipation. As will be understood, the direction of rotation indicated by the arrow in FIG. 3 requires that the several cylindrical plugs constructed in the fashion shown at FIGS. 3 and 4 be installed so that the strips provide something of a common circle when installed.

FIG. 5 shows an alternate form having a strip 35 constructed with a more narrow waist and wider end portions. This assures that a ring contact is provided by the multiple disk when installed.

Attention is now directed to FIG. 6 of the drawings which shows a pair of adjacent cylindrical plugs supported in the ring 15. There, the first plug is identified by the numeral 40 and the adjacent plug is identified by the numeral 41, it being understood that both are provided with PCD disk exposed so that they almost form a contiguous line of support about the full circumference of the ring 15. In like fashion, FIG. 7 shows an alternate embodiment 50 where the resilient plugs have a different construction. In that embodiment, a first plug is shown having a base portion 51 represented in dotted line which connects with an enlarged shoulder area 52. The enlargement 52 is on the exterior of the ring and extends above it to then support a PCD disk 53 which is attached to it in the same fashion as the embodiment 10 shown in FIGS. 1 and 2. The difference however is in the construction of the cylindrical plug 20 which has been constructed as illustrated in FIG. 7 to have an enlarged head area which defines an undercut region. The undercut region exposes a large area of the plug to the lubricants flowing in the immediate vicinity. In particular, there is a passage 54 between adjacent cylindrical plugs so that the adjacent PCD disk 55 is lubricated along with the disk 53 just mentioned. Lubricant flows through the lateral passage 54 and carries heat away. This provides an enhanced surface area for heat dissipation in comparison with the embodiment 10 shown in FIG. 6.

Another alteration that is acceptable in the present construction for the PCD disk is a non circular disk which has a length which resembles that shown in FIG. 3 and yet which can have two sides which can be parallel and regular as illustrated or which can be irregular, for instance in the fashion of a broken PCD disk. This enables the use of a disk which has been damaged in process and which will still have substantially a dimension approaching the required diameter for the plug on which such a disk is mounted. As one will understand, it is a random sort of thing to describe the outer periphery of such disk. Suffice it to say, a broken disk having a chipped away corner or side can still be used. For instance, the PCD strip 32 shown in FIG. 3, while idealized, can be approximated by such a broken PCD disk.

In assembly of the present device, the embodiment 50 is assembled in the same fashion as the other embodiments shown in FIGS. 1 and 2. The embodiments in FIGS. 3 and 5 are assembled by preforming the slot or groove in the plug body and then anchoring the PCD material in that slot or groove. Care must be taken to align the PCD strip 32 of FIG. 3 so that it is properly oriented with respect to the arrow of movement and hence the locus of contact defined by the rotating bearing assembly 10, see FIG. 1.

While the foregoing is directed to the preferred embodiment, the scope thereof is determined by the claims which follow.

I claim:

1. A bearing assembly comprising:
   (a) a metal ring having upper and lower ring faces;
   (b) a plurality of holes formed in said upper face extending into said ring to define a plurality of support shoulders and upstanding cylindrical sidewalls adjacent to said shoulders;
   (c) cylindrical plugs supporting PCD bearing surfaces at an exposed end thereof, wherein said plugs and said PCD bearing surfaces form assemblies of uniform height;
   (d) braze material formed on the side of said plugs, wherein said braze material joins said plugs solely to the sidewalls of said holes to position said PCD bearing surfaces in an exposed ring for bearing a load therein; and
   (e) wherein said plugs are vertically positioned and supported by sitting directly on said shoulders with none of said braze material interposed such that said PCD surfaces are at a common height supported on said shoulders.

2. The apparatus of claim 1 wherein said PCD surfaces are defined within a circle.

3. The apparatus of claim 2 wherein said PCD surfaces include diametric strips across each of said circles wherein the diametric strips are alinged with respect to a locus of rotation for the bearing assembly ring.

4. The apparatus of claim 3 wherein said diametric strips terminate at segments of a circle.

5. The apparatus of claim 4 wherein said diametric strips collectively form a supportive bearing surface, and said plugs are cut away at said diametric strips, thereby defining an exposed area at the plug and marginally along said strips for exposure to cooling fluid flow during use.

6. The bearing assembly of claim 1 further comprising a gas outlet extending from said shoulder to said lower ring surface enabling gases formed during the brazing process to escape.

7. A replacement plug for use in a bearing assembly having a ring which supports plural plugs wherein said replacement plug comprises an elongate plug body having two ends and having a cylindrical shape, and a PCD surface attached to an exposed end thereof, wherein said PCD surface is confined within a circle and has sufficient surface area to define a diametric strip thereacross within said circle, wherein said diametric strip is between two parallel lines.

8. The apparatus of claim 7 wherein said diametric strip terminates at segments of arcs defined by said circle.

9. The replacement plug of claim 7 wherein said diametric strip has four sides with two of said sides being formed of arcs of said circle and said remaining sides extending to said two parallel lines.

10. The replacement plug of claim 9 wherein said diametric strip has four sides with two of said sides being formed of arcs of said circle and said remaining sides are straight line segments.

11. The replacement plug of claim 9 wherein said diametric strip has four sides with two of said sides being formed of arcs of said circle and said remaining sides are broken line segments.

12. The replacement plug of claim 9 wherein said diametric strip has four sides with two of said sides being formed of arcs of said circle and said remaining sides are arcuate segments.

13. The replacement plug of claim 9 wherein said diametric strip has four sides with two of said sides being formed of arcs of said circle and said remaining sides define a specified minimum surface area to provide an adequate bearing surface.

14. A bearing assembly comprising:
   (a) a metal ring having upper and lower ring faces;
   (b) a plurality of holes formed in said upper face extending into said ring to define a plurality of support shoulders and upstanding cylindrical sidewalls adjacent to said shoulders;
   (c) cylindrical plugs comprising an elongate plug body having two ends and having a cylindrical shape and a PCD surface attached to an exposed end thereof;
   (d) wherein said PCD surface is confined within a circle and has sufficient surface area to define a diametric strip formed between two parallel edges and extends across said circle, and further wherein said plugs and said PCD bearing surfaces form assemblies of uniform height;
   (e) braze material formed on the side of said plugs, wherein said braze material joins said plugs solely to the sidewalls of said holes to position said PCD bearing surfaces in an exposed ring for bearing a load therein; and
   (f) wherein said plugs are vertically positioned and supported by sitting directly on said shoulders with none of said braze material interposed such that said PCD surfaces are at a common height supported on said shoulders.

15. A bearing assembly comprising:
   (a) a metal ring having upper and lower ring faces;
   (b) a plurality of holes formed in said upper face extending into said ring to define a plurality of support shoulders and upstanding cylindrical sidewalls adjacent to said shoulders;
   (c) cylindrical plugs supporting PCD bearing surfaces at an exposed end thereof;
   (d) wherein said PCD surface is confined within a circle and has sufficient surface area to define a diametric strips across each of said circles wherein said diametric stips terminate at segments of said circle and are aligned with respect to a locus of rotation for bearing assembly ring, and further wherein said plugs and said PCD bearing surfaces form assemblies of uniform height;

(e) wherein said diametric strips collectively form a supportive bearing surface; and (e) braze material formed on the side of said plugs, wherein said braze material joins said plugs solely to the sidewalls of said holes to position said PCD bearing surfaces in an exposed ring for bearing a load therein; and (f) wherein said plugs are vertically positioned and supported by sitting directly on said shoulders with none of said braze material interposed such that said PCD surfaces are at a common height supported on said shoulders, and wherein said plugs are cut away at said diametric strips, thereby defining an exposed area at said plugs and marginally along said diametric strips for exposure to cooling fluid flow during use.

* * * * *